(12) United States Patent
Chandrashekarappa et al.

(10) Patent No.: US 12,072,206 B2
(45) Date of Patent: Aug. 27, 2024

(54) SYSTEMS AND METHODS FOR DISPLAYING TERMINAL AREA PROCEDURE CHARTS

(71) Applicant: HONEYWELL INTERNATIONAL INC., Charlotte, NC (US)

(72) Inventors: Mohan Chandrashekarappa, Hyderabad (IN); Sridevi Nagaraja, Bangalore (IN); Subhra Dey, Hyderabad (IN); Kiran Venkataramana, Bangalore (IN); Babitha Jajur, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 170 days.

(21) Appl. No.: 17/028,036

(22) Filed: Sep. 22, 2020

(65) Prior Publication Data
US 2022/0034682 A1    Feb. 3, 2022

(30) Foreign Application Priority Data
Jul. 29, 2020 (IN) .............................. 202011032461

(51) Int. Cl.
*G06F 3/048* (2013.01)
*B64D 43/00* (2006.01)
(Continued)

(52) U.S. Cl.
CPC ........... *G01C 23/005* (2013.01); *G01C 5/005* (2013.01); *G01C 21/20* (2013.01); *G08G 5/0021* (2013.01)

(58) Field of Classification Search
None
See application file for complete search history.

(56) References Cited

U.S. PATENT DOCUMENTS 6,263,263 B1    7/2001   Shehi et al.
6,400,282 B1 *  6/2002   Germanetti ............ B64D 43/00
                                                      701/14
(Continued)

FOREIGN PATENT DOCUMENTS

CN    202221566 U    5/2012
EP    1852683 B1    6/2014

OTHER PUBLICATIONS

Anonymous, "Areonautical Information Manual—Official Guide to Basic Flight Information and ATC Procedures", Oct. 12, 2017, pp. 1-732, XP055859743, URL:https://www.faa.gov/air_traffic/publications/media/aim_basic_dtd_10-12-17.pdf.
(Continued)

*Primary Examiner* — Adam D Tissot
*Assistant Examiner* — Michael T Silva
(74) *Attorney, Agent, or Firm* — Lorenz & Kopf LLP

(57) ABSTRACT

Methods and systems of generating a data driven digital chart. The methods and systems include retrieving a data driven chart for a requested terminal area procedure chart from a database of data driven charts. The data driven charts describe digital terminal area procedure charts by way of data elements for each terminal area procedure chart including geodetic straights, arcs, text elements and symbols defined with respect to location. Some of the data elements are further defined with respect to altitude values assuming a standard atmospheric temperature value. The systems and methods include calculating compensated altitude values for the data elements of the retrieved data driven chart based on a deviation between the outside air temperature value and the standard atmospheric temperature value. The methods and systems include generating a presentation for a display device of the aircraft of the terminal area procedure chart.

17 Claims, 8 Drawing Sheets

(51) Int. Cl.
    *G01C 5/00*     (2006.01)
    *G01C 21/20*     (2006.01)
    *G01C 23/00*     (2006.01)
    *G06F 3/0482*     (2013.01)
    *G06F 3/0483*     (2013.01)
    *G06F 3/0484*     (2022.01)
    *G06T 11/20*     (2006.01)
    *G08G 5/00*     (2006.01)
    *G10L 15/26*     (2006.01)

(56) References Cited

U.S. PATENT DOCUMENTS

| | | | |
|---|---|---|---|
| 7,009,553 B1* | 3/2006 | Billings | G08G 5/0013 342/51 |
| 7,599,766 B2 | 10/2009 | Ardila et al. | |
| 10,061,480 B1* | 8/2018 | McCusker | G06T 11/206 |
| 10,217,370 B2* | 2/2019 | King | G08G 5/025 |
| 10,607,494 B2 | 3/2020 | Durocher | |
| 2006/0247828 A1* | 11/2006 | Ardila | G01C 23/00 701/14 |
| 2007/0260364 A1* | 11/2007 | Dwyer | G08G 5/065 701/3 |
| 2010/0148990 A1* | 6/2010 | Burgin | G08G 5/0021 340/971 |
| 2011/0199237 A1* | 8/2011 | Clark | G08G 5/0021 340/970 |
| 2012/0310524 A1* | 12/2012 | Pepitone | G08G 5/025 701/411 |
| 2014/0354455 A1* | 12/2014 | Samuthirapandian | B64D 45/00 340/970 |
| 2015/0162001 A1* | 6/2015 | Kar | G08G 5/0013 704/235 |
| 2015/0162011 A1* | 6/2015 | Qi | G10L 19/0204 704/500 |
| 2015/0239574 A1* | 8/2015 | Ball | G08G 5/0052 701/3 |
| 2019/0108760 A1* | 4/2019 | Krishna | G01C 5/005 |
| 2019/0392718 A1* | 12/2019 | Turner | G01C 5/005 |
| 2020/0103228 A1* | 4/2020 | Ridenour | G01W 1/02 |
| 2020/0173809 A1* | 6/2020 | Turner | G01C 23/005 |

OTHER PUBLICATIONS

Ferdinand, Behrend, et al. "Simulations Investigating Curved Departure and Arrival Procedures Using GNSS Based Vertical Guidance," IEEE, 2018, The Technology Library. Downloaded on Jun. 12, 2020 at 11:33:46 UTC from IEEE Xplore.

"Eurocontrol Guidelines for Cold Temperature Corrections by ATS," Edition 1.0, dated Oct. 24, 2014.

International Civil Aviation Organization, Procedures for Air Navigation Services Aircraft Operations, vol. 1—Flight Procedures, Document 8168, Sixth Edition, Aug. 29, 2018.

Altimeter Temperature Error Correction, downloaded from http://www.skybrary.aero/index.php/Altimeter_Temperature_Error_Correction, on Sep. 19, 2017.

* cited by examiner

SYSTEMS AND METHODS FOR DISPLAYING TERMINAL AREA PROCEDURE CHARTS

CROSS REFERENCE TO RELATED APPLICATION

This application claims priority to Indian Provisional Patent Application No. 202011032461, filed Jul. 29, 2020, the entire content of which is incorporated by reference herein.

TECHNICAL FIELD

The present disclosure generally relates to systems and methods for displaying terminal area procedure charts on a cockpit display system of an aircraft. More particularly, the present disclosure relates to systems and methods for calculating temperature compensated altitude values (e.g. for computing temperature compensated trajectories) for inclusion in terminal area procedure charts.

BACKGROUND

When a flight is executed in non-standard atmospheric conditions as defined by the International Standard Atmosphere (ISA), the aircraft is either lower or higher than the indicated barometric altitude based on whether the external temperature is lower or higher than the assumed ISA conditions. Consequently, there is a risk that the specified clearance above an obstacle or specified clearance of an aircraft from another aircraft is no longer sufficient.

Aeronautical Information Publications (AIPs) are issued by, or with the authority of, a state (on behalf of the respective civil aviation administration) according to International Civil Aviation Organization (ICAO) standards and contain aeronautical information details of regulations, procedures and other information pertinent to flying aircraft in the particular country to which it relates. Terminal Procedure Publications (TPPs) are an important component of the AIPs. Included in the Terminal Procedures Publications as diagrammatic charts are: Instrument Approach Procedure (IAP) Charts, Departure Procedure (DP) Charts, Standard Terminal Arrival (STAR) Charts, Charted Visual Flight Procedures (CVFP) and Airport Diagrams (AD).

The nomenclature and symbology indicated on the Terminal Procedure Publications, henceforth simplistically referred to as the Procedure Charts or Terminal Area procedure charts, is standardized by the International Civil Aviation Organization (ICAO) to be used across the globe and independent of prevailing environmental conditions of weather and temperature at the designated terminal or enroute region which can vary over a period of time. Altitude values printed on the procedure charts are Mean Sea Level (MSL) altitudes or Above Ground Level (AGL) altitudes. Flight Instruments like the Primary Flight Display (PFD) indicate altitude in Mean Sea Level (MSL) reference.

The International Standard Atmosphere (ISA) is an atmospheric model of how the pressure, temperature, density, and viscosity of the Earth's atmosphere change over a wide range of altitudes or elevations. The International Organization for Standardization (ISO) publishes the ISA as an international standard, e.g. ISO 2533:1975. Most flight instruments indicate altitude in Mean Sea Level (MSL) assuming ISA conditions. ICAO PANS OPS (e.g. Doc 8168) requires that "The calculated minimum safe altitudes/heights must be adjusted when the ambient temperature on the surface is much lower than that predicted by the standard atmosphere". The most efficient means to mitigate the effect of non-standard atmospheric conditions is to quantify the effect of the difference from ISA in the form of a correction that should be added to the minimum flight altitudes/heights to ensure the appropriate clearance above obstacles and terrain. ATS Authorities are responsible to develop and establish the necessary corrections for the cold temperature effect on altimetry and provide the air traffic control the values for minimum flight altitudes/minimum vectoring to be used in cold temperature conditions.

A Temperature Deviation is defined as the difference between the Actual Temperature either sensed by the aircraft or measured at the closest airfield and the International Standard Atmosphere Temperature at a given altitude (ISADEV=(Actual Temperature−International Standard Atmosphere Temperature)). According to the PAN OPS (Doc 8168), the following logic is applied for temperature compensation for non-standard atmospheric conditions: For temperatures above −15° C., an approximate correction is 4 percent height increase for every 10° C. below standard temperature as measured at the altimeter setting source and this is safe for all altimeter setting source altitudes. For temperatures below −15° C., the temperature correction is defined by the below equation (equation 1, which is disclosed in the following) which produces results that are within 5% of the accurate correction for altitudes between 10000 and 5000 feet above that source. However, more accurate corrections may also be computed based on the equations specified in the PAN OPS document. For temperatures colder than −15 degrees, a more accurate correction may be obtained according to the guidance provided in the 'Temperature corrections' section of the document.

Historically, pilots are always required to carry printed approach and terminal procedure charts for reference in their flight bag. These would refresh every Aeronautical Information Regulation And Control (AIRAC) cycle (typically 28 days) and the charts would be reprinted for pilots to be replaced in their flight bags. Pilots would keep open these printed charts into operating airports for reference. With the advent of the Electronic Flight Bag (EFB) or the Electronic Flight Bags (Portable Tablets or Fixed Tertiary Cockpit Displays), printed charts were no longer required. Electronic format of the charts (scanned PDF or Raster Images) replaced the print media on the EFB, but altitude values are defined with respect to ISA conditions (including temperature) and are not editable.

Hence, it is desirable to provide systems and methods for compensating for the effect of the temperature variation from ISA conditions in terminal area procedure charts to ensure that all applications, and pilots, reference the corrected altitudes. More specifically, it is desirable to provide methods and systems that facilitate accurate and informative temperature compensated altitude values. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Methods and systems are provided for generating a data driven digital chart. The methods and systems retrieve a data driven chart for a requested terminal area procedure chart from a database of data driven charts. The data driven charts describe digital terminal area procedure charts by way of data elements for each terminal area procedure chart including geodetic straights, arcs, text elements and symbols defined with respect to location. Some of the data elements are further defined with respect to altitude values defined assuming a standard atmospheric temperature value. The systems and methods include calculating compensated altitude values for the data elements of the retrieved data driven chart based on a deviation between the outside air temperature value and the standard atmospheric temperature value. The methods and systems include generating a presentation for a display device of the aircraft of the terminal area procedure chart including the compensated altitude values.

Furthermore, other desirable features and characteristics will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
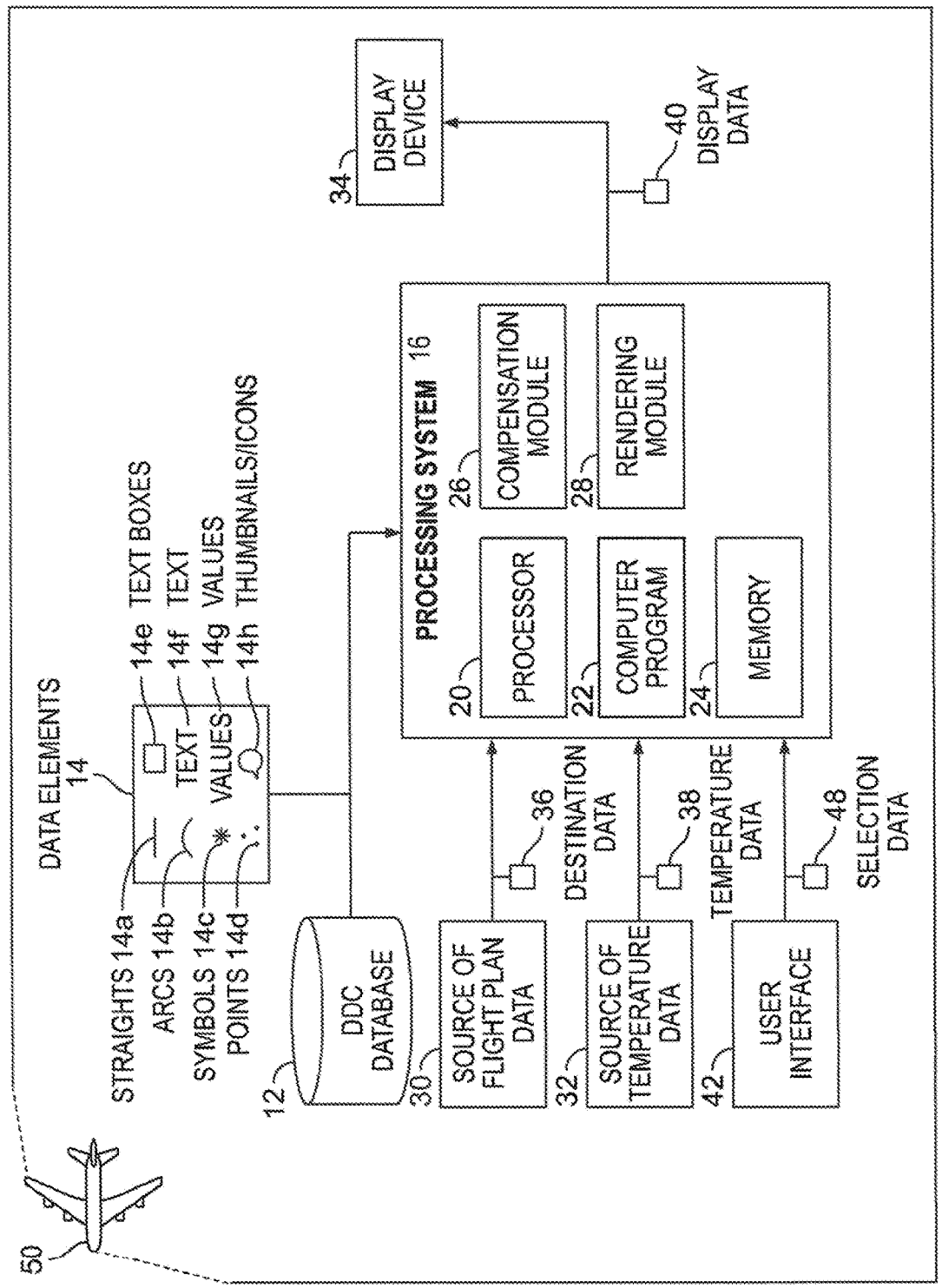
FIG. 1 is a block diagram depicting a display system of an aircraft, in accordance with an exemplary embodiment.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The systems and methods described herein are for providing temperature compensated displays of terminal area procedure charts including vertical profiles and altitude references on electronic chart display applications based on the prevailing atmospheric conditions. The present disclosure deals with an inherent limitation in the way the terminal area procedure charts either in print or digital format are coded and used by the pilots and, more specifically, deals with the altitude representations on Procedure Charts.

Described herein are techniques for applying temperature compensation on the true altitude references used in digital terminal area procedure charting applications. Based on the user or pilot configuration, computational pre-processing can be applied to all the altitude references (vertical situation display, minimum sector altitude, decision altitudes, altitude constraints, etc.) on a digital procedure chart in electronic format to render a temperature compensated terminal area procedure chart for pilot use on Electronic Flight Bag or Interactive Navigation applications. The temperature compensation may be calculated based on the below model, by way of a look up table or some other model relating altitude correction to temperature deviation from ISA temperature.

$$\text{Correction} = H \times \left( \frac{15 - t_0}{273 + t_0 - 0.5 \times L_0 \times (H + H_{ss})} \right) \quad \text{(equation 1)}$$

where:

$H$ = minimum height above the altimeter setting source (setting source is normally the aerodrome unless otherwise specified)

$t_0 = t_{aerodrome} + L_0 \times h_{aerodrome}$ aerodrome (or specified temperature reporting point) temperature adjusted to sea level $L_0 = 0.00198°$ C./ft -continued $H_{ss}$ = altimeter setting source elevation $t_{aerodrome}$ = aerodrome (or specified temperature reporting point) temperature $h_{aerodrome}$ = aerdorome (or specified temperature reporting point) elevation In most current day usage, terminal area procedure charts are digitized and electronic versions are made available on Electronic Flight Bags (EFBs) or on Integrated Navigation (INAV) Display applications. These terminal area procedure charts may be in PDF or raster format, which does not lend itself to determining compensated altitude values. The systems and methods described herein process all altitude references on a digital electronic procedure chart depiction and apply a temperature compensation as indicated by the logic defined above. The terminal area procedure charts are stored in a database, with each chart made up of data elements including data fields for altitude, thereby making the altitude values available for altitude compensation calculations and correction. The digital or electronic procedure charts are then rendered using the new corrected or compensated altitude references on the target applications.

In order to ensure that the pilot has access to both the compensated and non-compensated versions of the procedure charts, an option can be provided to the pilot to select options for applying temperature compensation or removing an applied temperature compensation. Additionally, the Outside Air Temperature (OAT) to be used for the compensation algorithms may be entered by the pilot based on the airfield temperature or even automatically consumed from the temperature sensors on board or from another source.

Indications can be made on the procedure charts about the ISA temperature, the OAT, the ISA deviation and the computed correction altitude. Controls can be provided for the pilot to also apply or cancel a temperature compensation for the barometric altitude values depicted on the procedure charts. The OAT can be automatically populated or be allowed for the pilot to enter or tailor.

Various exemplary use cases for the systems and methods described herein are described. In one exemplary use case, the vertical map or vertical descent profile depicted on the procedure chart is adjusted. The descent profile is typically depicted using Mean Sea Level (MSL) altitudes considering standard atmospheric conditions. If the OAT were significantly lower than the ISA temperature on a specific day, a temperature compensated digital procedure chart will be a significant safety benefit for the pilot for terminal area operations. On a profile view, several elements of altitude are referenced with respect to MSL assuming ISA conditions, for example: procedure notes associated with the profile view, minimum altitude when executing a procedure turn, tracks with corresponding crossing altitudes, flight tracks with associated altitude levels, etc. These altitude values can be temperature compensated. Further, not only can displayed numeric altitude values be temperature compensated but associated graphics can be correspondingly adjusted in position (such as a vertical profile).

Another example of an exemplary use case is the Approach Briefing section at the top of an Approach plate. Example elements in the Approach briefing section include Glideslope Clearing Altitude for precision approaches, Decision Altitude (DA) or Minimum Decision Altitude (MDA), Missed Approach Procedure, Airport or procedure transition level and altitude, etc. Typically, these altitude references are defined with respect to MSL altitudes assuming standard atmospheric conditions. The temperature compensation can be applied to all altitude references other than the ones which represent elevation levels above ground level to present a modified digital procedure chart to the pilot. A different color coding can be used to indicate to the pilot that a compensation has been applied.

Another exemplary use case of altitude references in procedure charts are the ones used to specify the Minimum Sector Altitudes (MSA) or Minimum Safe Altitudes on instrument charts, which provide 1000 feet of obstacle clearance within a 25 nm radius from the navigation facility upon which MSA is predicated. MSA altitudes are also indicated as MSL altitudes assuming ISA conditions. The systems and methods of the present disclosure can intelligently apply the temperature corrections and display compensated MSA representation on the electronic charts such as the minimum safe altitude in each defined sector as depicted on the procedure chart.

Another exemplary use case is circling minimums, which are charted on the procedure charts when a circling OCA (H) or MDA (H) is provided by the procedure source. Again, the charted altitude values are non-compensated altitude values above MSL assuming ISA conditions. In such scenarios, the present disclosure presents compensated MSL altitudes on the Circling minimums table along with as-is AGL values if any.

Another exemplary use case is that of the display of the Segment Minimum Altitudes in the profile view of the procedure chart. Such a presentation may include sector minimum altitudes for different segments of the approach procedure and are indicated in MSL altitude assuming ISA conditions in the database and corresponding temperature compensated altitude values in a temperature compensated presentation as described herein.

Current systems only present raw digitized information, which include altitude references in Mean Sea Level (MSL) in accordance with ISA assumptions. The cockpit system applications like the Flight Management Systems (FMS) and Autopilot systems have capabilities to compensate for temperature when they generate an altitude profile or predict one. The pilot in the terminal area is mostly reliant on the procedure charts for safe execution of flight maneuvers with respect to the terminal area constraints. A pilot referencing procedure chart and trying to compare it with a lateral or vertical profile displayed on the cockpit system from a flight management system is often confused and unable to relate the values presented on the display system with the ones referenced in the terminal area procedure charts. Printed or Digital charts like the ones on electronic flight bags or on INAV display systems currently do not have any capabilities to provide temperature compensated values for altitude profiles. The systems and methods described herein provide a novel technique and data format, which can be applied to a digital or electronic chart application to enhance safety in the terminal area and ensure adherence to safe separation and clearance altitudes. The overall safety of the flight, and also the operational efficiency of the flight, is enhanced by the automation provided by the present disclosure.

The present disclosure enhances the whole experience of the integrated information presented to the pilot in an intuitive way on the advanced electronic flight bag chart application or on the cockpit system display applications. The described solution also enhances safety of terminal area operations and increases operational efficiency due to automation of temperature compensation of reference altitudes.

Prior solutions assume a RASTER image or a PDF (non-editable) depiction of the terminal area procedure chart, which does not allow temperature compensation. The systems and methods described herein begins with encoding the terminal area procedure charts into Data Driven Charts (DDC). In the disclosed DDCs or digital charting applications, all data elements of the chart are coded in a database in the form of a combination of straights, arcs, points, text, thumbnail elements, symbols, etc. The data elements are then rendered on a digital display to provide the same visualization as that of a conventional RASTER image or PDF but using temperature compensated altitude values when required and optionally when requested by a user. The fact that there is a backend database that drives these digital charting applications (DDC), temperature compensation can be applied on all data elements that contain an altitude reference including graphical and alphanumeric data elements. In some embodiments, one can present non-compensated and compensated lateral and vertical profiles and other chart elements like MSA (minimum sector altitude) etc. in dependence on a user or system selection.

The digital charting display rendering system disclosed herein is driven by a Data Driven Chart (DDC) database wherein discrete component elements of the terminal area procedure chart are stored as geodetic points, straights, arcs, text elements, thumbnails, symbols, etc. rather than a database of raster images or PDF, which are non-editable and thus not able to be subject to temperature compensation. The Data Driven Charts (DDC), or sometimes synonymously quoted as just Digital Charts, for the terminal area procedure charts facilitate temperature compensated, advanced displays that are better integrated with other temperature compensated displays in the cockpit. Instead of storing the terminal procedure charts as a raster image or PDF into which the user or a computer system or software has limited control, a database of elements coded in a DDC database is used to generate the terminal area procedure chart. In embodiments, constituent elements of the terminal area procedure chart are coded in the DDC database with plural combinations of straight lines, arcs, text boxes, symbols, thumbnails, alphanumerics, etc. A display rendering module described herein aggregates the discrete database elements depictions on a canvas to produce a terminal area procedure chart visualization. The charts so accomplished allow for much user control and friendliness including simple elements like controlling visualization based on ambient light or much complex elements like dynamic rendering of only must and essential elements of the chart based on prevailing aircraft conditions. Further, and in accordance with embodiments described herein, the charts include a significant advancement whereby temperature compensated profiles and other altitude referenced features are presented.

The display rendering module of embodiments of the present disclosure, visualizes an approach chart or a terminal area procedure chart by regenerating discrete elements coded into a database including by drawing straights, arcs, text, symbols, etc. in 3D space. Straights would be represented in the database at a minimum with a start and end position (latitude/longitude pair) and optionally an altitude and other parameters. Arcs would be represented in the database with start and end position values along with radius as distance and optionally an altitude and other parameters. Symbols, text boxes, thumbnails and other graphic features will be stored in their image equivalents with an associated position (which may include altitude) at which they will need to be placed. Each terminal procedure chart will have a combination of these in the database. These are only exemplary coding formats and one can accomplish the database coding in other alternative forms. The display rendering module is able to regenerate the chart by using the data specified in the database, which is a combination of multiple discrete elements. The terminal procedure charts described herein need not be 2D only. 3D visualizations are envisaged, which are represented on 2D displays with capabilities of rotating and visualizing the chart in all perspectives.

FIG. 1 is a schematic diagram of a display system 10 of an aircraft 50. The display system 10 includes a DDC database 12, a source of flight plan data 30, a source of temperature data 32, a user interface 42, a processing system 16 and a display device 34. It should be understood that FIG. 1 is a simplified representation of the display system 10, and FIG. 1 is not intended to limit the application or scope of the subject matter in any way. In practice, the display system 10 will include numerous other devices and components for providing additional functions and features, as will be appreciated in the art.

In embodiments, the aircraft 50 includes a cockpit, one or more engines, and a fuselage. The aircraft 50 can be a multicopter (or rotary-wing), fixed-wing or a tilt-wing aircraft. The aircraft 50 can be an airplane or a helicopter or other aircraft with powered rotors, such as cyclogyros/cyclocopters and tiltrotors. The display system 10 is located in the cockpit of the aircraft 50, although the display device 34 may be transportable.

In embodiments, the source of flight plan data 30 may be a flight management system, which manages the flight control of the aircraft 50. In other embodiments, the source of flight plan data 30 is a file stored in memory, which is user created or system created. The source of flight plan data 30 may be omitted in some embodiments and destination data may be user entered. For instance, the flight management system implements, manages, and/or controls a flight mode, flight path, flight plan, flight trajectory, etc. for the aircraft 50. The flight management system receives an input from a user via the user interface 42. The flight management system can be configured to implement one or more flight mode(s), flight plans, etc. of the aircraft 50 selected by user input and display information associated with the one or more flight mode(s) on display device 34. In embodiments, a navigation function of the flight management system allows a route to be programmed by a user through the user interface 42. A flight director (not shown) and an auto-pilot system (not shown) can steer the aircraft 50 along the desired course to an active waypoint. When the aircraft reaches an active waypoint, the flight management system automatically sequences to the next waypoint in the route, unless waypoint sequencing is suspended. The flight management system outputs destination data 36 defining a target airport or runway for the aircraft 50. The processing system 16 may receive the destination data 36 and generate airport or runway specific display data 40 including a terminal area procedure chart. For example, the destination runway included in the destination data 36 may be centered in the rendered terminal area procedure chart and a predetermined or variably defined area around the destination runway can be included in the presentation of the terminal area procedure chart. The processing system 16 may be configured to automatically render the terminal area procedure chart in response to data from the FMS indicating a certain closeness to the destination airport or in response to a request from a user submitted via the user interface 42.

In embodiments, the user interface 42 is located in the cockpit or is associated with the display device 34 (e.g. as a touchscreen of an EFB device) and provides input to one or more system(s) of the aircraft 50. The user interface 42 includes any device suitable to accept input from a user for interaction with the systems of the aircraft 50. For example, the user interface 42 includes one or more of a keyboard, joystick, multi-way rocker switches, mouse, trackball, touch screen, touch pad, data entry keys, a microphone suitable for voice recognition, and/or any other suitable device. The user interface 42 allows the user to interact with a graphic and/or textual data element provided for display on the display device 34. In particular embodiments, the user interface 42 can be controlled by a user to submit a request for a terminal area procedure chart, to receive responsive interactions to the terminal area procedure chart (e.g. selection of just one type of presentation such as a vertical profile view, to zoom in on a part of a presentation, to display another type of presentation, to rotate the presentation with respect to one or more axes, etc.), to submit or cancel a request to temperature compensate altitude values, to enter OAT, among other uses. The user selection data 48 from the user interface 42 is taken as an input to the processing system 16, which responds by adjusting the rendered presentation of the terminal area procedure chart.

In embodiments, the source of temperature data 32 provides temperature data 38, which includes OAT. In embodiments, the OAT relates to the temperature at or near the airport. The source of temperature data 32 may be an OAT sensor of the aircraft 50, satellite weather data, uplinked weather data, user entered via the user interface 42, combinations thereof, etc. The temperature data 38 is used by the processing system 16 to generate compensated altitude values, which are included in compensated terminal area procedure charts as described further herein.

The DDC database 12 is a data driven chart database 12 that includes terminal area procedure charts for many airports. Unlike prior art systems where the terminal area procedure charts are defined as a whole by a raster or PDF data format, the terminal area procedure charts of the DDC database are each defined by a combination of data elements 14. The data elements include various different types of data elements 14 including straights (or straight lines) 14a, arcs (or arced lines) 14b, symbols 14c, points 14d, text (or alphanumeric) boxes 14e, shapes (not shown), text 14f, numeric values 14g, thumbnails/icons 14h, etc. Some or all of the data elements 14 are defined with respect to a location including an altitude. The altitude is defined in the DDC database 12 assuming ISA conditions including ISA temperature. In the case of straights 14a, arcs 14b, points 14d, text boxes 14e, shapes, thumbnails/icons 14h, these may be defined geodetically using longitude, latitude and, in many cases, altitude in real world coordinates. Straights may be defined in terms of start and end points. Arcs may be defined in terms of start and end points and a degree or radius of curvature. Text boxes and other rectangular shapes may be defined in terms of three corner points. Symbols or thumbnails/icons or other graphical features may be defined as images with a location corresponding to a center point. The points in the fields of the DDC database 12 that are used to define a number of data elements 14 may be geodetically defined and often include altitude values. The processing system 16 may interrogate the DDC database 12 for the data elements 14 associated with a particular destination location (e.g. a runway) or a destination region (e.g. defined by a certain geofence). The retrieved data elements 14 are arranged according to, at least in part, location and combined when rendering the terminal area procedure chart. In embodiments, the processing system 16 retrieves data elements 14 making up a terminal area procedure chart based on destination data 36 so that only a relevant airport or region within an airport is rendered.

In embodiments, the display device 34 includes a head down display (HDD), a head up display (HUD), a wearable HUD, a portable display or any combination thereof. The display device 34 may be a cockpit integrated display or an EFB device. The display device 34 outputs one of various terminal area procedure related presentations such as those described with reference to FIGS. 2 to 7 in the following. The terminal area procedure presentations are rendered using a combination of many discrete data elements 14. When temperature compensated altitudes are to be applied, the processing system 16 adjusts the altitude values associated with the data elements 14 to render the temperature compensated terminal area procedure presentations.

Figure 8:
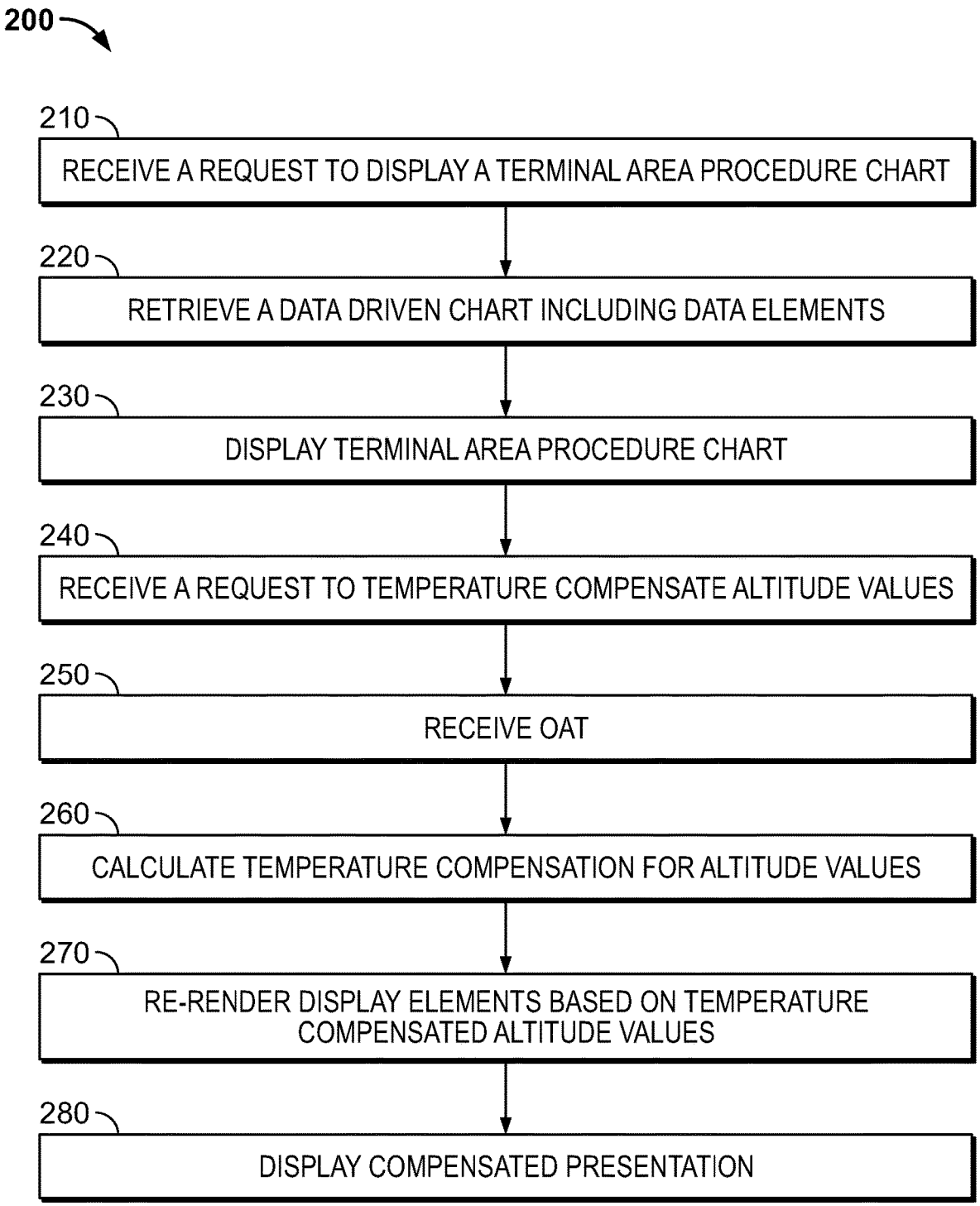
FIG. 8 is a flow chart of a method of generating and rendering terminal area procedure charts, in accordance with an exemplary embodiment.

In embodiments, the processing system 16 implements functions of the display system 10 of FIG. 1 and steps of the method 200 of FIG. 8. The processing system 16 includes one or more processor(s) 20, one or more memory device(s) 24, one or more computer programs 22, a compensation module 26 and a rendering module 28. The processor 20 can include any suitable processing device, such as a microprocessor, microcontroller, integrated circuit, logic device, or other suitable processing device. The one or more memory device(s) 24 can include one or more computer-readable media, including, but not limited to, non-transitory computer-readable media, RAM, ROM, hard drives, flash drives, or other memory devices.

The one or more memory device(s) 24 can store information accessible by the processor 20, including one or more computer program(s) 22, which include computer-readable instructions that can be executed by the processor 20. The instructions can be any set of instructions that, when executed by the processor 20, cause the processor 20 to perform operations corresponding to functions and method steps described herein. The instructions can be software written in any suitable programming language or can be implemented in hardware. In some embodiments, the instructions can be executed by the processor 20 to cause the processor 20 to perform operations, such as the operations for temperature compensating altitude values and generating presentations of terminal area procedure charts as described herein.

The memory device(s) 24 can further store data that can be accessed by the processor 20. For example, the data can include a navigational database, data associated with a navigation system(s), data associated with the control mechanisms, data indicative of a flight plan associated with the aircraft 50, data associated with flight director mode selection, data associated with a flight management system, and/or any other data associated with aircraft 50, as described herein. The data can include one or more table(s), function(s), algorithm(s), model(s), equation(s), etc. for navigating the aircraft 50. Although the compensation module 26 and the rendering module 28 are shown separately from the computer programs 22, these modules would, in practice, be implemented by computer executable program instructions embodied by the computer programs 22. Further, computer programs 22 are shown separately from memory 24, but may be stored within memory 24.

The compensation module 26 receives altitude values and OAT as inputs and outputs temperature compensated altitude values (or an amount of correction to be applied). The compensation module 26 may compensate altitude for other non-ISA prevailing conditions such as air pressure, which can be provided as a further input. The compensation module 26 may utilize a model based on equation 1 above, another model or even a look-up table or other data format defining a relationship between input OAT and altitude corrections. In embodiments, the compensation module 26 calculates temperature compensated altitudes based on a deviation between OAT and the reference temperature for the altitude values in the DDC database 12.

The rendering module 28 receives a request for rendering a terminal area procedure chart, optionally any user selections including a request for temperature compensation of altitude values and any additional user requirements (e.g. a particular portion of the terminal area procedure chart data, a zoom selection, a rotation selection, etc.) and optionally destination data 36. The rendering module 28 retrieves a destination specific terminal area procedure chart from the DDC database 12 based on the destination data 36, which includes combinations of many data elements 14. When a request for temperature compensation is also received, the altitude values associated with the data elements 14 that are defined with respect to ISA (or other reference standard) temperature are extracted and converted to temperature compensated altitude values based on OAT using the compensation module 26. The ISA altitude values included in some or all of the data elements 14 are thus supplemented with, or replaced by, temperature compensated altitude values. The rendering module 28 renders display data 40 by combining data elements 14 to produce the various presentations of terminal area procedure charts described herein. When the data elements 14 have altitude compensated values, these altitude compensated values will be utilized, which may mean that graphic features are positionally adjusted in the presentations such as the position of straights, arcs, symbols, icons, thumbnails, alphanumeric boxes, shapes, points, etc. Further, numeric altitude values are adjusted to the compensated altitude values.

Figure 2:
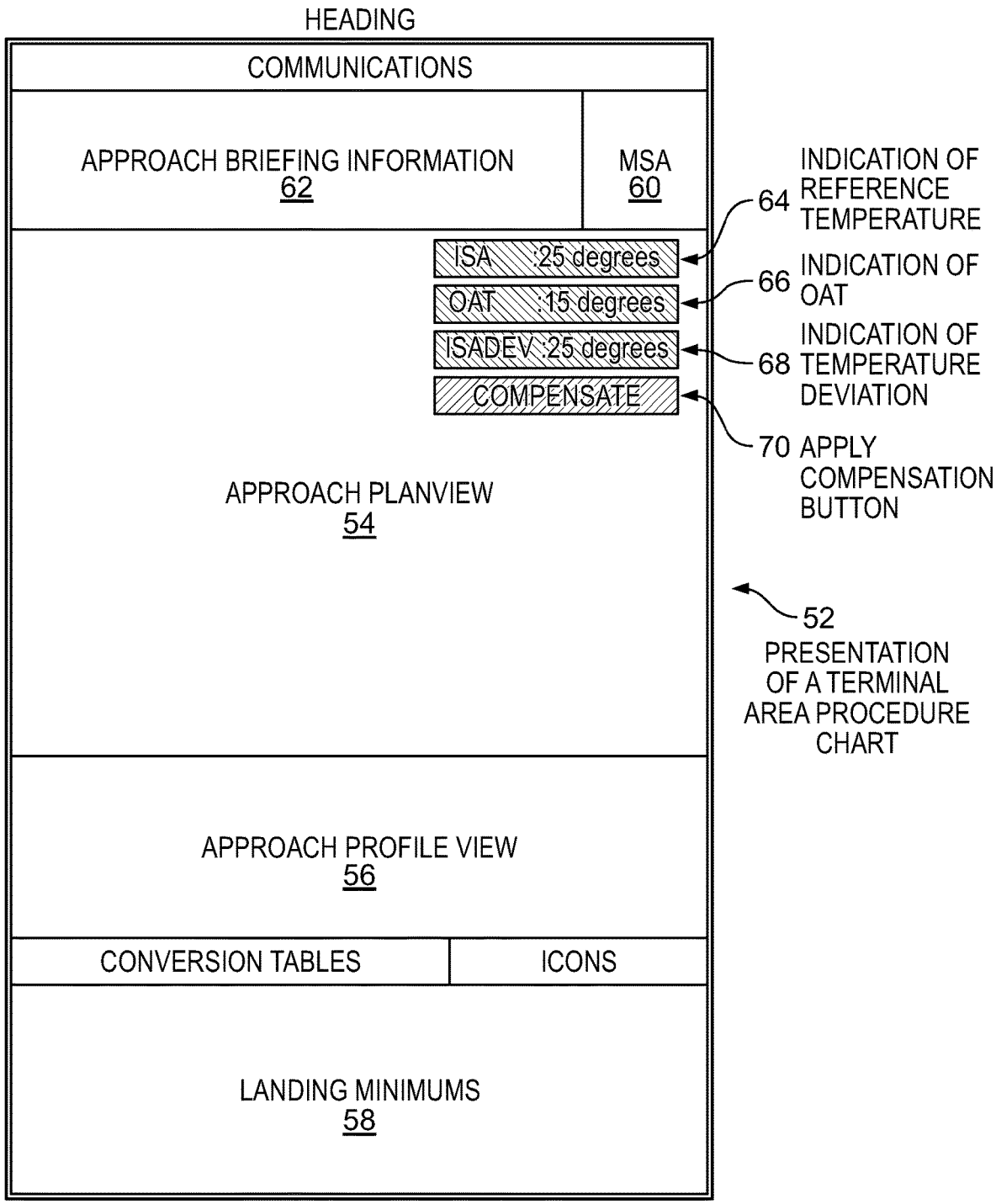
FIG. 2 is an exemplary presentation of a terminal area procedure chart, in accordance with an exemplary embodiment.

FIG. 2 is an exemplary presentation 52 of a terminal area procedure chart. The presentation 52 is shown on the display device 34 based on display data 40, which is produced by processing system 16 as described above. The presentation 52 includes various sections including approach briefing information 62, minimum sector altitudes (MSA) 60, landing minimums 58, approach plan view 54 and approach profile view 56. In some embodiments, a user may select, via the user interface 42, one of the sections in order to render a full screen view of just that section. In other embodiments, a user may select, via the user interface 42, to zoom in or out of the various sections and/or to rotate a view such as the plan or approach profile view. The presentation 52 (or approach plate) may be generated for the whole airport or for a particular runway at an airport based on the specificity of the location defined in the destination data 36. The presentation 52 may include an apply compensation button 70, which is user selectable, via the user interface 42, to cause altitude values in the various sections of the presentation 52 to be temperature compensated by compensation processing and new rendering by the processing system 16 as described above. The apply compensation button may be a physical or virtual button. After compensation has been applied, the presentation 52 may include a cancel button (not shown) so that that the user can go back to the non-compensated view. In some embodiments, presentation 52 additionally includes at least one of: an indication of the reference (or ISA) temperature 64, an indication of OAT 66 and an indication of temperature deviation 68 between the reference temperature and the OAT. In the exemplary embodiment of FIG. 2, the various sections are vertically separated in the presentation 52 so that the approach briefing information 62 is located above the approach planview 54, which is located above the approach profile view, which is located above the landing minimums 58.

Figure 3:
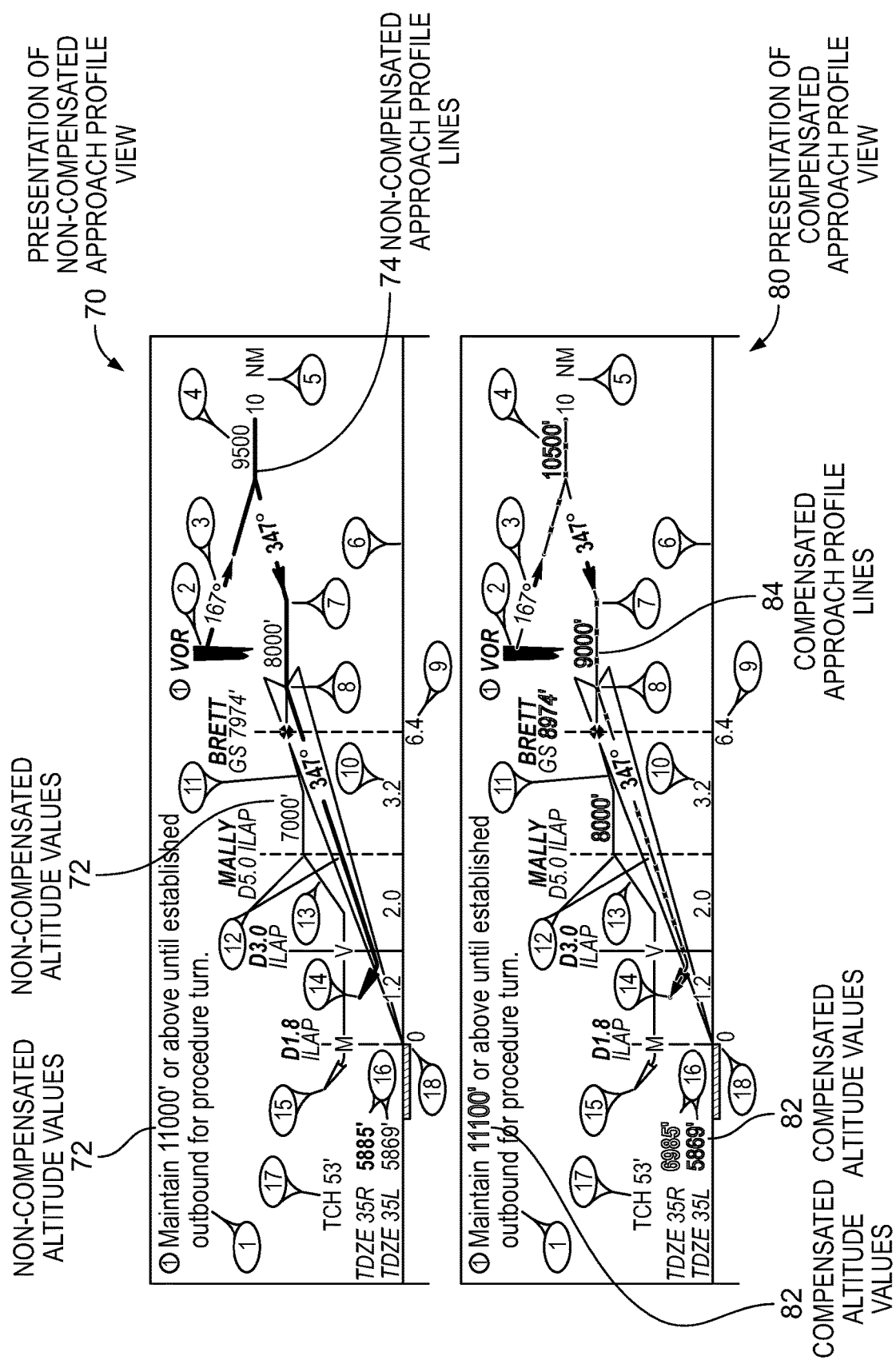
FIG. 3 is an exemplary presentation of approach profile views, in accordance with exemplary embodiments.

FIG. 3 includes a presentation 70 of non-compensated approach profile view and a presentation 80 of a compensated approach profile view. The presentations 70, 80 both include vertical profiles of the instrument approach procedure. The presentations 70, 80 include the published descent profile and graphical depiction of the vertical path using facilities, intersections, fixes, etc. identified in the procedure to the destination runway. A profile view of the procedure track is shown. The approach track begins toward the top of the primary facility line, unless otherwise dictated by the procedure, and descends to where the final approach ends and the missed approach begins. The presentations 70, 80 include various symbols, lines, shapes, numeric values, label icons, etc. Although both the non-compensated and compensated presentations 70, 80 are shown together in FIG. 3, this is by way of illustration. Both versions could be displayed together, but it is preferred that non-compensated presentation 70 be displayed when compensation has not been user or system selected and compensated presentation 80 be displayed when compensation has been user or system selected. In the presentation 80 of compensated approach profile views, various compensated altitude values 82 are shown overlaid or replacing the non-compensated altitude values 72. In some embodiments, the non-compensated and compensated altitude values 72, 82 could be displayed next to each other. In embodiments, the compensated altitude values 82 are shown in a different color, font style, boldness or other visually differentiable manner than the non-compensated altitude values 72. Further, compensated approach profile lines 84 are shown to graphically reflect adjusted altitude values in the lines of the vertical path. In the exemplary embodiment of FIG. 3, both non-compensated and compensated approach profile lines 74, 84 making up the vertical path are shown (albeit visually differentiated by coloring or lines style). However, just the compensated approach profiles lines 84 may be shown. Further, when symbols, label icons, text boxes, shapes, etc. in the presentation 80 of compensated approach profile view are associated with altitude values in the DDC database 12, these data elements 14 may also be adjusted in vertical position based on temperature compensated altitude values and the re-drawing of each data element 14.

Figure 4:
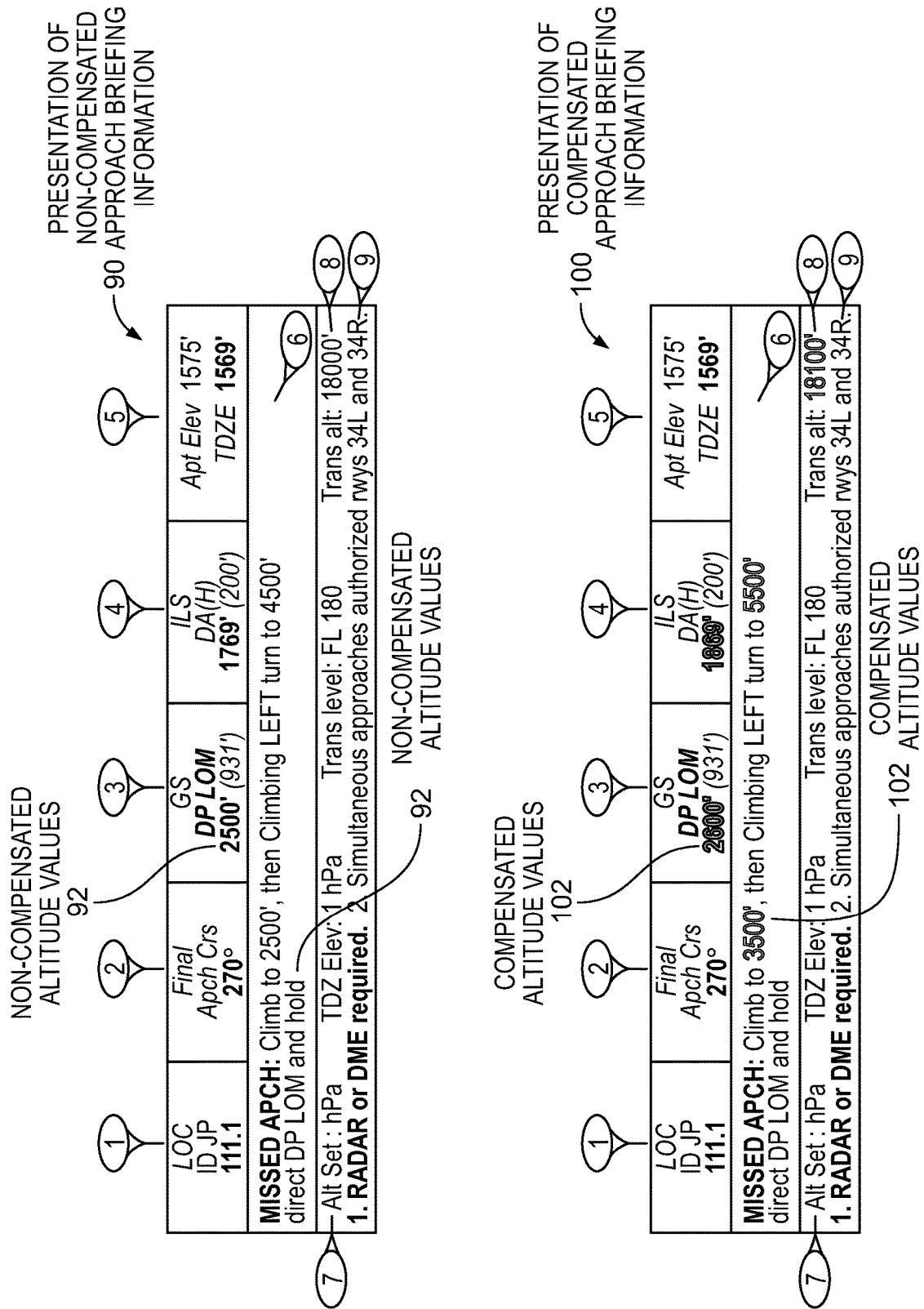
FIG. 4 is an exemplary presentation of approach briefing information, in accordance with exemplary embodiments.

FIG. 4 includes a presentation 90 of non-compensated approach briefing information and a presentation 100 of compensated approach briefing information, in accordance with an exemplary embodiment. As with the other embodiments of FIGS. 3 and 5 to 7, it is not necessary or preferred (but it is possible) that both non-compensated and compensated presentations 90, 100 are shown at the same time. Prior to user or system selection to apply temperature compensation, non-compensated altitude values 92 are displayed. After user or system selection to apply temperature compensation, compensated values 102 are displayed, optionally in a visually different manner.

Figure 5:
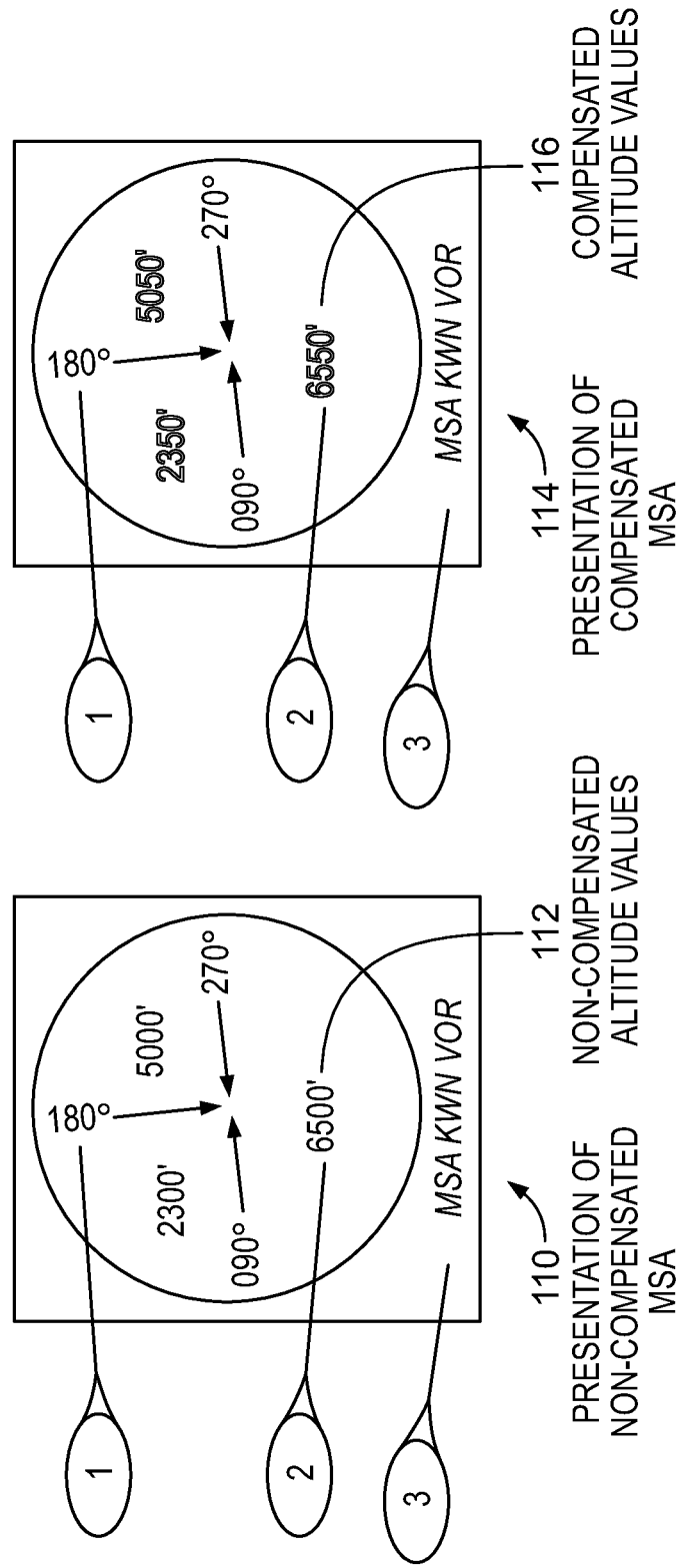
FIG. 5 an exemplary presentation of minimum sector altitudes, in accordance with exemplary embodiments.

FIG. 5 includes a presentation 110 of non-compensated Minimum Sector (or Safe) Altitude (MSA) and a presentation 110 of compensated Minimum Sector Altitude (MSA), in accordance with an exemplary embodiment. In FIG. 2, the MSA section 60 is shown laterally adjacent the approach briefing information 62. However, the MSA may also be included in the approach planview section 54. MSAs are published for emergency use on IAP charts. The MSA is based on the primary NAVAID, waypoint, or airport reference point on which the IAP is predicated. The MSA depiction on the approach chart contains the identifier of the NAVAID/waypoint/airport used to determine the MSA altitudes. MSAs are expressed in feet above mean sea level and normally have a 25 NM radius; however, this radius may be expanded to 30 NM if necessary, to encompass the airport landing surfaces. MSAs provide 1,000 feet clearance over all obstructions. The MSA altitude values are shown non-compensated in the presentation 110. Compensated altitude values 116 for the MSA are included in the presentation 114, which is rendered when the user of the system selects to apply compensation. The compensated altitude values 116 are shown in a visually different format than the non-compensated altitude values 112.

Figure 6:
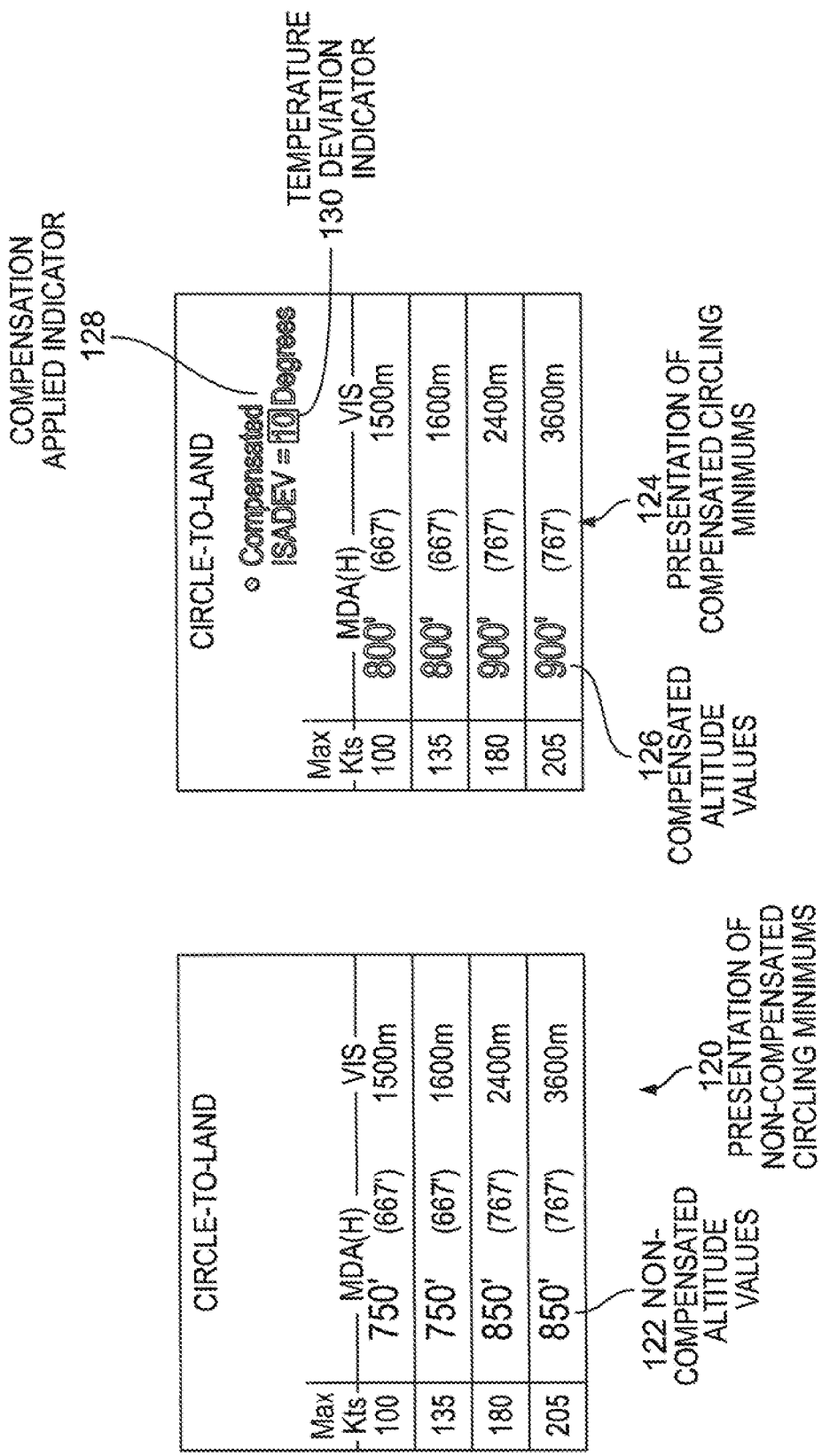
FIG. 6 is an exemplary presentation of circle to land minimums, in accordance with exemplary embodiments.

FIG. 6 includes a presentation of non-compensated circling minimums 120 and a presentation of compensated circling minimums 124, in accordance with an exemplary embodiment. The circle to land minimums, circling minimums or landing minimums section 58 may be positioned below the approach profile view in FIG. 2. This section gives the pilot the lowest altitude and visibility requirements for the approach. There are two types of landing minimums: Straight-in landing or Circling. Straight in landing minimums are the Minimum Descent Altitude (MDA) and visibility, or Decision Height (DH) and visibility, required for a straight-in landing on a specified runway. Circling minimums are the MDA and visibility required for the circle-to-land maneuver. Although circling minimums are exemplified in FIG. 6, altitude compensation could similarly be applied for straight-in landing minimums. The presentation 120 includes non-compensated altitude values 122 and the presentation 124 includes compensated altitude values 126, which are rendered when a user or system selection has been made to apply altitude compensation. In the example of FIG. 6, the presentation 124 includes a compensation applied indicator 128 that appears when temperature compensated altitude values are display. In the example of FIG. 6, the presentation 124 additionally or alternatively includes a temperature deviation indicator 130 showing a deviation between OAT and the reference temperature for the altitude values in the DDC database 12. Such indicators could be included in the other presentations of FIGS. 3 to 5 and 7.

Figure 7:
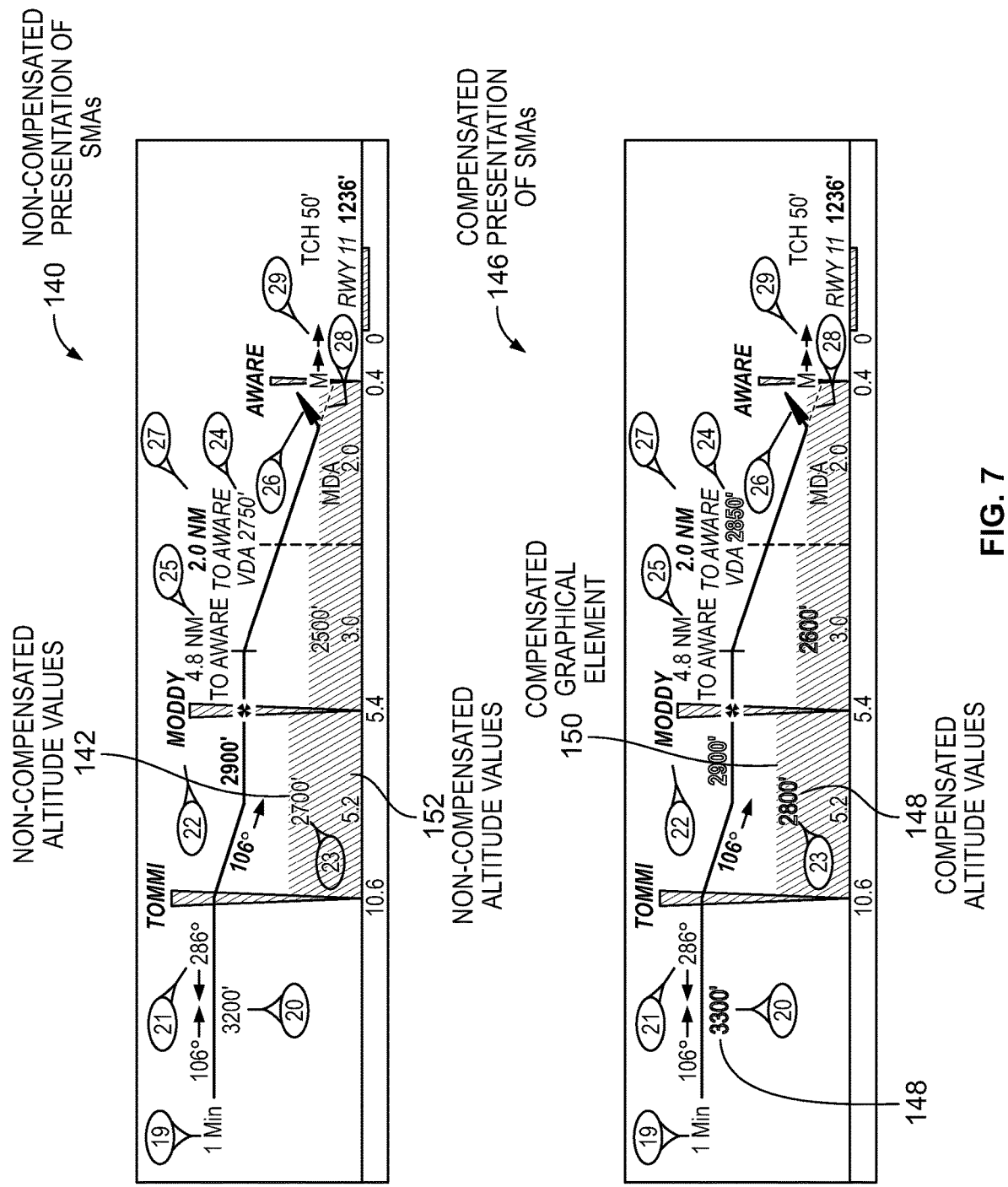
FIG. 7 is an exemplary presentation of segment minimum altitudes, in accordance with exemplary embodiments.

FIG. 7 includes a non-compensated presentation 140 of Segment Minimum Altitudes (SMAs) 140 and a compensated presentation 146 of SMAs. SMAs provide required obstacle clearance for a given segment of the approach. It is a minimum Instrument Flight Rules (IFR) altitude established by the procedure designer and meant to be a "do not descend below" altitude. SMAs must not be violated. In the depicted example of FIG. 7, the MSAs are depicted as shaded blocks (or other graphical element) 150, 152 in association with numeric altitude values 142, 148. The presentation 140 includes one or more non-compensated graphical elements 152 in the form of a shaded block having a height determined by the non-compensated altitude values 142, which are also displayed in or adjacent the graphical elements 152. In the DDC database 12, the non-compensated graphical element 152 may be stored as a shape data element 14 in association with an ISA altitude value. The compensated presentation 146 of SMAs is displayed after a compensation apply selection is made by the processing system 16 or the user. The compensated presentation 146 includes compensated altitudes values 148 that are shown in a visually different format or color than the non-compensated altitude values 142. Further, the compensated presentation 146 includes compensated graphical elements 150 in the form of shaded blocks having an adjusted height (altitude) as compared to the non-compensated graphical elements 152. The corresponding data element 14 in the DDC database 12 (e.g. a rectangle shape) has a height set by the non-compensated altitude value. When the altitude value is changed by the compensation module 26, the height of the data element 14 is also changed, thereby rendering the compensated graphical element 150. In FIG. 7, there are also compensated altitude values 148 associated with the vertical path profile. Although not highlighted in FIG. 7, the straight lines (which are a data element 14 in the DDC database 12) making up the vertical profile also have a vertical position set by ISA (or other reference standard) altitude values in the DDC database 12. The vertical position of the straight lines of the vertical profile are adjusted in the compensated presentation 146 in the same manner to that described with respect to FIG. 3.

Although the presentations of FIGS. 3 to 7 are depicted separately, these presentations can be shown on the same screen in the corresponding sections of FIG. 2 or a similar combined view. When the compensation is selected, the altitude numeric values and the position or height of graphical elements (e.g. straights, shapes, etc.) are adjusted in all of the presentations (where compensated altitude values are relevant) in each section of the presentation of a terminal procedure chart 52 (or approach plate). This provides an intuitive way to visualize altitude compensations for IAPs and provides enhanced integration with automated altitude compensations applied in other displays based on FMS data such as primary flight displays, multi-functional displays, etc. It should be appreciated that static publications are being compensated according to the present disclosure rather than real-time data relating specifically to the current flight and its progress from the FMS and other aircraft systems. Yet further, the present disclosure provides a data format for the storage of terminal area procedure charts (or approach plates) that allows the altitude values and associated graphical indications to be adjusted based on prevailing atmospheric conditions including temperature. As such, flight safety can be improved.

FIG. 8 is a process flow chart detailing a method 200 for rendering and display a presentation of a terminal area procedure chart. The order of operation within the method 200 is not limited to the sequential execution as illustrated in the figure, but may be performed in one or more varying orders as applicable and in accordance with the present disclosure. Steps of the of method 200 are performed by the one or more processors 20 of the processing system 16 executing computer programming instructions of the one or more computer programs 22. Method 200 may be instigated when a selection is made by a user through the user interface 42 to temperature compensate altitude values in a displayed terminal area procedure chart. Additionally or alternatively, method 200 may be automatically instigated by the processing system 16 such as when the temperature deviation between the reference temperature and the OAT at the destination exceeds a certain threshold.

The method 200 includes step 210 of receiving a request to display a terminal area procedure chart. The request may be received by the processing system 16 in response to a user selection through the user interface 42 or may be received automatically based on proximity to the destination.

In step 220, a data driven chart is retrieved by the processing system 16 from the DDC database 12. The data driven chart includes data elements 14 that are aggregated in order to produce a presentation of the terminal area procedure chart. The data elements 14 relevant to the retrieved data driven chart may be selected based on destination, e.g. only those data elements 14 within a proximity of a destination runway or airport are selected, which may be determined based on location information associated with each data element 14. At least some of the data elements 14 are associated with altitude values that are defined with respect to standard atmospheric conditions including a reference temperature. The rendering module 40 renders a presentation of the terminal area procedure chart, such as the outline of the presentation 50 of FIG. 2, thereby displaying the terminal area procedure chart according to step 230. The presentation 50 may include an apply compensation button 70 to allow a user to select, through the user interface 42, to apply temperature compensation to displayed altitude values and any graphical features that are positionally or size defined with respect to altitude values.

In step 240, a request to temperature compensate altitude values is received by the processing system 16, e.g. in response to a user selection of the apply compensation button 70 or based on a system request such as the processing system 16 determining that the OAT deviates from the reference temperature by an amount greater than a threshold.

In step 250, the OAT is received by the processing system 16. OAT can be sensed by one or more onboard temperature sensing devices of the aircraft 50, can be received from other aircraft, can be unlinked from a ground station, can be provided through a satellite communication, can be provided by a manual entry through the user interface 42, can be provided by an application providing predicted or historical OATs or in any other suitable way. In embodiments, the OAT is received for different position values (longitude and/latitude) covered by the data driven chart to be drawn. The OAT for the various geographic locations included in the chart are sensed or measured or predicted or estimated. In some embodiments, step 250 encompasses computing a three-dimensional grid of interpolated OAT values for all points in the procedure chart to be drawn. Step 250 includes, in one embodiment, calculating the OAT values for all the designated points on the procedure chart for which the correction is desired at the corresponding geographic location. Since it may not be practical to measure OAT at every geographic position combination in the region of interest corresponding to the procedure chart, interpolation helps estimate the best temperature estimate at any desired position.

In step 260, the processing system 16, specifically the compensation module 26, temperature compensates the altitude values associated with the retrieved data elements 14 based on a deviation between the reference temperature and the OAT.

In step 270, the display elements are re-rendered based on the temperature compensated altitude values. In embodiments, compensated numeric altitude values are included in the compensated presentation of the terminal area procedure chart. Further, position or size or otherwise adjusted graphical features are included in the compensated presentation, with the adjustments being made based on the compensate altitude values. In particular, the vertical position of straights in an approach profile view are adjusted to fit the compensated altitude values as shown in FIG. 3 and/or the height of shape elements representing the SMAs are adjusted as shown in FIG. 7. Other adjustments of graphical features may be made including position of symbols, icons, thumbnails, points, text boxes, etc. These various graphical elements are included in the DDC database 12 and are defined with respect to an altitude at standard atmospheric conditions and are re-defined when the altitude is adjusted based on prevailing atmospheric conditions.

In step 280, the compensated presentation of the terminal area procedure chart is displayed per one or any combination of the compensated presentations shown in FIGS. 3 to 7.

Although not illustrated in the figures, the terminal area procedure charts may additionally include at least one of: a Notice to Airmen (NOTAM) or Temporary Flight Restriction (TFR) in textual or graphical representation, a speech transcribed instruction from the Air Traffic Controller (ATC) or the Airline Operations Center (AOC) in textual or graphical representation, and a depiction of neighboring terminal area aircraft traffic. Altitude values associated with these features may also be temperature compensated per the teaching described herein.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. For example, the solution can be further broadened to non-weather information (e.g. airspaces). It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A data driven digital chart display system for an aircraft, the display system comprising:
    a display device;
    a database of data driven charts describing digital terminal area procedure charts, wherein each digital terminal area procedure chart is constructed by discrete data elements included, by coding, in the database, the discrete data elements including geodetic straights, arcs, text elements and symbols defined with respect to a location associated with each discrete data element, wherein at least some of the discrete data elements are further defined with respect to altitude values assuming a standard atmospheric temperature value;
    at least one processor in operable communication with the display device and the database, the at least one processor configured to execute program instructions, wherein the program instructions are configured to cause the at least one processor to:
        generate a presentation, for the display device, of a first terminal area procedure chart including uncompensated altitude values;
        receive an outside air temperature value;
        retrieve the data driven chart for a second terminal area procedure chart including the discrete data elements, wherein at least one of the discrete data elements describes a graphical element having a size or position set in the database based on an altitude value assuming the standard atmospheric temperature value, wherein the altitude value is temperature compensated by the at least one processor, and the position or size of the graphical element is adjusted in the presentation based on the temperature compensated altitude value;
        calculate the compensated altitude values for the at least some of the discrete data elements of the retrieved data driven chart based on the altitude values assuming the standard atmospheric temperature value and a deviation between the outside air temperature value and the standard atmospheric temperature value; and
        generate a new rendering of a presentation, for the display device, of the second terminal area procedure chart by combining the discrete data elements according to the location associated with each discrete data element including the compensated altitude values for the at least some of the discrete data elements of the retrieved data driven chart, wherein the presentation of the second terminal area chart includes a selectable cancel button to request re-rendering of the presentation of the first terminal area chart on the display device where the compensated altitude values are removed and replaced with the uncompensated altitude values, a speech transcribed instruction from an Air Traffic Controller (ATC) or an Airline Operations Center (AOC) in textual or graphical representation and a depiction of a neighboring terminal area aircraft traffic.

2. The data driven digital chart display system of claim 1, wherein the display device is an electronic flight bag display device.

3. The data driven digital chart display system of claim 1, wherein the display device is a navigation display.

4. The data driven digital chart display system of claim 1, wherein the second terminal area procedure chart includes an approach plate.

5. The data driven digital chart display system of claim 1, wherein the second terminal area procedure chart includes approach briefing information.

6. The data driven digital chart display system of claim 1, wherein the second terminal area procedure chart includes a minimum sector altitude or a minimum safe altitude chart.

7. The data driven digital chart display system of claim 1, wherein the second terminal area procedure chart includes a circle to land minimums chart.

8. The data driven digital chart display system of claim 1, wherein the second terminal area procedure chart includes a segment minimum altitudes chart.

9. The data driven digital chart display system of claim 1, wherein the second terminal area procedure chart includes a Notice to Airmen (NOTAM) or a Temporary Flight Restriction (TFR) in textual or graphical representation.

10. The data driven digital chart display system of claim 1, wherein the outside air temperature value is received from at least one of: a temperature sensor, an external source, a manual entry and an application providing predicted or historical outside air temperature values.

11. The data driven digital chart display system of claim 1, wherein the program instructions are configured to cause the at least one processor to generate and render a display of the first terminal area procedure chart including a selectable option to request presentation of the second terminal area chart including the compensated altitude values and wherein the program instructions are configured to calculate the compensated altitude values and generate the presentation of the second terminal area procedure chart including the compensated altitude values when the selectable option has been selected.

12. The data driven digital chart display system of claim 11, wherein the program instructions are configured to cause the at least one processor to generate the display including the selectable option, the outside air temperature value and the deviation between the outside air temperature value and the standard atmospheric temperature value.

13. The data driven digital chart display system of claim 1, wherein the presentation includes a representation of at least one difference between the flight procedures defined in the second terminal area procedure chart based on the outside air temperature value and the flight procedure defined in the first terminal area procedure chart retrieved from the database.

14. The data driven digital chart display system of claim 1, wherein the presentation includes a corrected terminal area procedure vertical or lateral profile and the terminal area procedure vertical or lateral profile retrieved from the database displayed together in a visually differentiated way.

15. The data driven digital chart display system of claim 1, wherein the presentation includes a corrected terminal area procedure vertical or lateral profile that has been corrected from a terminal area procedure vertical or lateral profile retrieved from the database, corrected based on the compensated altitude values.

16. A method of generating a data driven digital chart in an aircraft, the method comprising:
  receiving, via at least one processor of the aircraft, an outside air temperature value;
  generating, via the at least one processor, a presentation for a display device of an aircraft, a first terminal area procedure chart including uncompensated altitude values;
  retrieving, via the at least one processor, a data driven chart for a second terminal area procedure chart from a database of data driven charts, the digital terminal area procedure charts constructed from discrete data elements included in the database, by coding, the discrete data elements including geodetic straights, arcs, text elements and symbols defined with respect to a location associated with each discrete data element, wherein at least some of the discrete data elements are further defined with respect to altitude values assuming a standard atmospheric temperature value and at least one of the discrete data elements describes a graphical element having a size or position set in the database based on an altitude value assuming the standard atmospheric temperature value, wherein the altitude value is temperature compensated by the at least one processor, and the position or size of the graphical element is adjusted in the presentation based on the temperature compensated altitude value ;;
  calculating, via the at least one processor, the compensated altitude values for the at least some of the data elements of the retrieved data driven chart based on the altitude values assuming the standard atmospheric temperature value and a deviation between the outside air temperature value and the standard atmospheric temperature value; and
  generate, via the at least one processor, a new rendering of a presentation for a display device of the aircraft, of the second terminal area procedure chart by combining the discrete data elements according to the location associated with each discrete data element including the compensated altitude values for the at least some of the discrete data elements of the retrieved data driven chart, wherein the presentation of the second terminal area chart includes a selectable cancel button to request re-rendering of the presentation of the first terminal area chart on the display device where the compensated altitude values are removed and replaced with the uncompensated altitude values, a speech transcribed instruction from an Air Traffic Controller (ATC) or an Airline Operations Center (AOC) in textual or graphical representation, and a depiction of a neighboring terminal area aircraft traffic.

17. The method of claim 16, wherein the at least some of the discrete data elements include straights or arcs defined with respect to altitude values defined with respect to a reference altitude assuming the standard atmospheric temperature value and the presentation includes a vertical profile or a lateral profile generated using the compensated altitude values for the straights or the arcs.

* * * * *